US011627095B2

(12) United States Patent
Ananthanarayanan et al.

(10) Patent No.: US 11,627,095 B2
(45) Date of Patent: Apr. 11, 2023

(54) ORCHESTRATING EDGE SERVICE WORKLOADS ACROSS EDGE HIERARCHIES

(71) Applicant: MICROSOFT TECHNOLOGY LICENSING, LLC, Redmond, WA (US)

(72) Inventors: Ganesh Ananthanarayanan, Seattle, WA (US); Yuanchao Shu, Kirkland, WA (US); Paramvir Bahl, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/348,701

(22) Filed: Jun. 15, 2021

(65) Prior Publication Data
US 2022/0400085 A1  Dec. 15, 2022

(51) Int. Cl.
  *H04L 47/726* (2022.01)
  *H04L 47/78* (2022.01)
  *H04L 47/762* (2022.01)
  *H04L 47/70* (2022.01)
  *H04L 41/044* (2022.01)

(52) U.S. Cl.
  CPC ......... *H04L 47/726* (2013.01); *H04L 41/044* (2013.01); *H04L 47/762* (2013.01); *H04L 47/782* (2013.01); *H04L 47/788* (2013.01); *H04L 47/828* (2013.01)

(58) Field of Classification Search
  CPC ... H04L 47/762; H04L 47/778; H04L 47/828; H04L 41/044; H04L 47/782
  See application file for complete search history.

(56) References Cited

U.S. PATENT DOCUMENTS 10,033,805 B1 * 7/2018 Mutnuru ............... H04L 47/125
10,374,968 B1 * 8/2019 Duerk .................. G06F 9/5044
(Continued)

OTHER PUBLICATIONS

"International Search Report and Written Opinion Issued in PCT Application No. PCT/US22/028871", dated Jul. 29, 2022, 12 Pages.
(Continued)

*Primary Examiner* — Mohamed A. Wasel
*Assistant Examiner* — Jihad K Boustany
(74) *Attorney, Agent, or Firm* — Newport IP, LLC; Han K. Gim

(57) ABSTRACT

Computing resources are managed in a computing environment comprising a computing service provider and an edge computing network. The edge computing network comprises computing and storage devices configured to extend computing resources of the computing service provider to remote users of the computing service provider. The edge computing network collects capacity and usage data for computing and network resources at the edge computing network. The capacity and usage data is sent to the computing service provider. Based on the capacity and usage data, the computing service provider, using a cost function, determines a distribution of workloads pertaining to a processing pipeline that has been partitioned into the workloads. The workloads can be executed at the computing service provider or the edge computing network.

20 Claims, 9 Drawing Sheets

(56) References Cited

U.S. PATENT DOCUMENTS

| | | | | |
|---|---|---|---|---|
| 2013/0268861 | A1* | 10/2013 | Bailey | G06F 9/5072 |
| | | | | 715/735 |
| 2015/0088586 | A1* | 3/2015 | Pavlas | G06F 9/45558 |
| | | | | 718/1 |
| 2015/0242242 | A1* | 8/2015 | Clayton | H04L 43/0823 |
| | | | | 709/224 |
| 2015/0339159 | A1* | 11/2015 | Gupta | G06F 9/5027 |
| | | | | 718/105 |
| 2017/0264493 | A1* | 9/2017 | Cencini | G06F 9/5083 |
| 2018/0300792 | A1* | 10/2018 | Dhurandhar | G06Q 30/0631 |
| 2018/0359312 | A1* | 12/2018 | Dabell | H04L 43/08 |
| 2019/0286484 | A1* | 9/2019 | Meirosu | G06F 9/4887 |

OTHER PUBLICATIONS

Zhao, et al., "Computation Offloading and Resource Allocation for Cloud Assisted Mobile Edge Computing in Vehicular Networks", In Journal of IEEE Transactions on Vehicular Technology, vol. 68, Issue 8, Aug. 1, 2019, pp. 7944-7956.

* cited by examiner

ORCHESTRATING EDGE SERVICE WORKLOADS ACROSS EDGE HIERARCHIES

BACKGROUND

A data center may house computer systems and various networking, storage, and other related components. Data centers may, for example, be used by service providers to provide computing services to businesses and individuals as a remote computing service or provide "software as a service" (e.g., cloud computing). Service providers may also utilize edge sites that may include a geographically distributed group of servers and other devices that work together to provide efficient delivery of content to end-users of data center services, with the goal being to provide services with high availability and improved latencies.

It is with respect to these considerations and others that the disclosure made herein is presented.

SUMMARY

In various embodiments, users of a computing service such as a cloud computing service may be provided use of such services via computing and storage resources of the computing service at a remote location ("edge site"). The users may continue to benefit from the computing services, while aspects of the services are incorporated into the edge sites. Edge sites enable a data center to extend cloud services to local deployments using a distributed architecture that enables federated options for local and remote data and control management. It is desirable to provide the highest level of computing availability at an edge site while at the same time providing performance and minimizing cost. (Note: The edge site is considered remote from the point of view of the cloud provider, but is actually local from the point of view of the customer/enterprise for whom it is on-premise. Thus the term "remote" should be understood based on the context as used herein).

When implementing edge computing, the network might be architected as a hierarchy of servers beginning close to where the data is generated to ending at servers that are part of the cloud. In such configurations, systems that manage the workloads have a choice as to which servers in the hierarchy to place workloads on. Thus, one issue when managing such as network is how a management/orchestration system determines how to distribute workloads among the components of the computation pipeline. This decision may depend on a plurality of factors, one of which is the required performance that is needed to meet service level agreements between the provider and the customer. The management/orchestration system must consider latency and energy budgets for the application and the servers. Monitoring server loads at the various levels of the hierarchy is another factor that influences such placement. The present disclosure describes techniques for optimizing the placement of workloads across the edge hierarchies to optimize one or more factors based on a cost function.

The described techniques can allow for incorporation of a user's resources on-premises while maintaining efficient use of computing resources such as processor cycles, memory, network bandwidth, and power. This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

Figure 1:
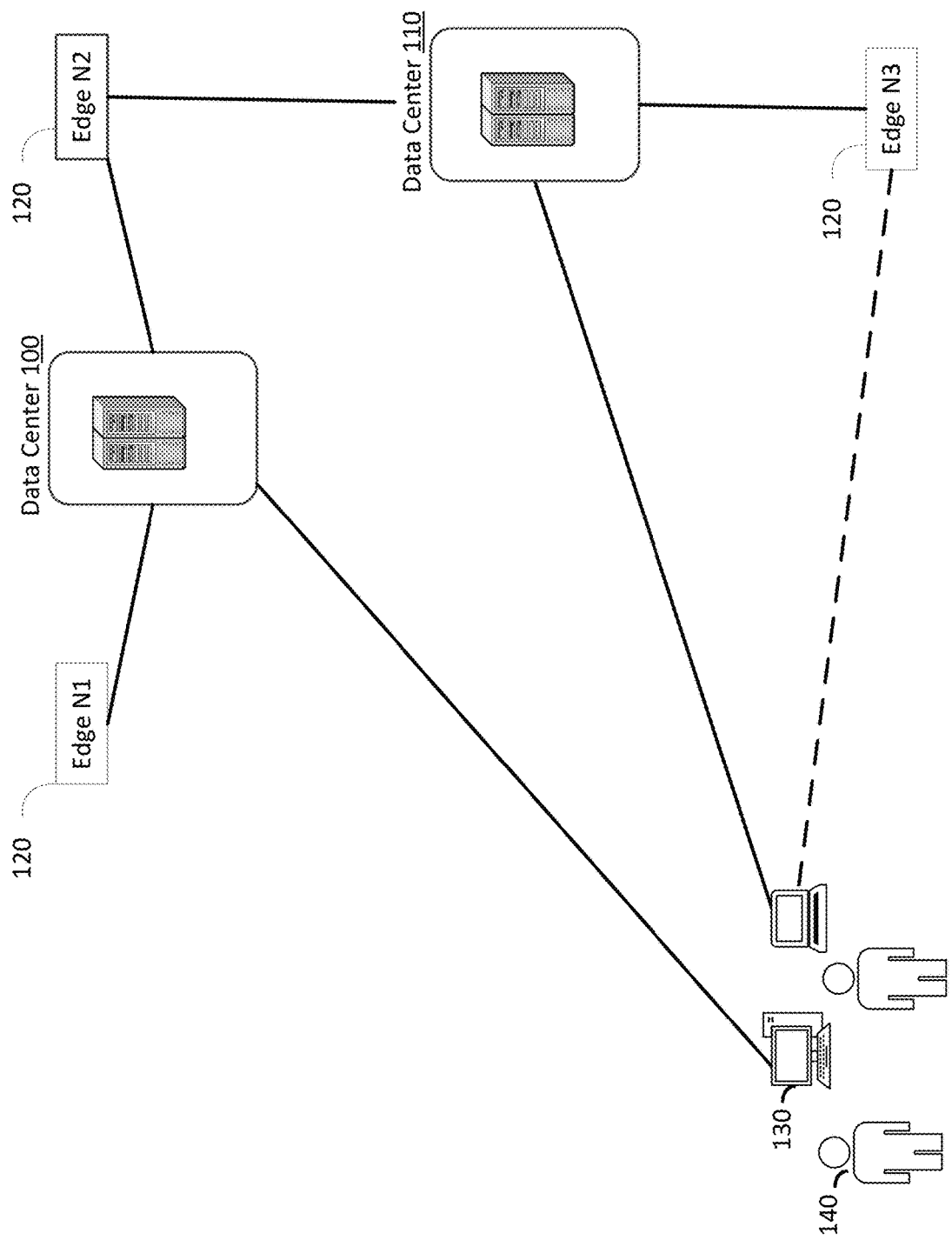
FIG. 1 is a diagram illustrating an example architecture in accordance with the present disclosure.

In some computing environments that provide virtualized computing and storage services, various computing and network services may be configured to enable the service provider to deploy their footprints closer to the user's premises, thereby extending the reach of the computing and network services closer to the user premises. For example, an enterprise that provides network carrier services may want computing services located closer to their networks or their customers, or a manufacturer may want to deploy computing resources closer to their facilities. Users of virtualized computing resources may benefit in many ways by deploying resources such as virtual machines on resources that are located closer to their premises. Additionally, localization of computing and storage devices may enable some users to more effectively meet data residency, compliance, latency, and other requirements, while continuing to benefit from many of the advantages of utilizing remote and/or virtualized computing services, such as scalability and flexibility. As used herein, "resources" may refer to various types of multi-dimensional resources including CPU, GPU, memory, etc.

Efficient management of the end-to-end capability services by the service provider can enable an experience that is seamless and consistent when using edge sites. The integration of local and remote resources with a comprehensive remote resource management approach can minimize the overhead for the service provider by maximizing the capabilities of the edge site. The effective distribution of the management functions can be determined based on the implications for various performance and security implications such as latency and data security.

The reach between remote and on-premise computing resources can be complex. For example, a remote computing service provider may implement multiple service regions and microregions. Some solutions may include dedicating a region and/or a microregion for a particular user. Other solutions may involve the remote service provider providing the remote service provider's hardware resources to the user for installation on their premises. The present disclosure enables the efficient distribution of tasks and workloads to computing resources located at various hierarchies between the user premises and the cloud to efficiently deliver services and allow the remote service provider to implement a comprehensive solution to the user's needs in an optimized manner. The computing resources may be provided by the user or provided by the remote service provider. Various embodiments disclosed herein include the integrated and federated management of the entire end-to-end capability.

Management of the end-to-end capability service by the remote service provider can enable an experience that is seamless and more consistent between local and public user footprints. The integration of local and remote resources with a comprehensive resource management approach can minimize the overhead for the user, who will not need to perform complex management tasks. The effective distribution of the workloads can be determined based on the implications for various performance and security implications such as latency and data security.

In many cases a network will have a hierarchy of sites, such as an on-premise edge, a network edge, and the cloud. In other examples, there may be more or less edge sites. One challenge is determining how to distribute workloads across the edges in a manner that optimizes the use of available resources in the network and at each edge site in order to achieve or optimize one or more objectives. For example, when collecting, processing, and transmitting video data or sensor data, the various tasks of the processing pipeline can be distributed among the edge sites.

In one embodiment, an orchestrator function may be implemented that intelligently places tasks on various edge networks based on capacities, bandwidth, policies, and other inputs. In an embodiment, a local edge manager may execute at each edge network. The local edge manager may communicate with the orchestrator to locally manage containers and other components running at the edge. The local edge manager and orchestrator may collectively monitor and manage available resources such as uplink and downlink capacity and computing capacity. The local edge manager may send information to the orchestrator that indicates the workload demands and availabilities at the edge. The orchestrator may analyze the information and send instructions to the local edge manager as to what processes should be run at the edge and if any changes are needed.

Within the confines of the instructions provided by the orchestrator, the local edge manager may locally manage workloads and other configurations at the edge to efficiently utilize the available resources. The capacities at the edge network may continuously change, for example when new workloads are brought into the edge (e.g., from local users at the edge network), and therefore the local compute capacity may change at any time. The local edge manager may provide the updated capacity information to the orchestrator which may generate updated instructions for redistributing workloads at the edge sites.

One aspect of the present disclosure is the balance between decisions made by the local edge manager and those made by the orchestrator. In some embodiments, workload decisions made by the orchestrator and workload decisions that are allowed to be made by the local edge manager may be determined based on a threshold.

In some embodiments, the orchestrator may determine workload distribution for a multi-level hierarchy based on a cost function. In many cases, a two-level hierarchy may be implemented, where an orchestrator (first hierarchy) makes decisions and delegates workloads to local edge managers (second hierarchy). However, the present disclosure may also be implemented when additional levels of hierarchy are implemented.

The cost function may allow for consideration of the various costs for performing a workload locally vs performing the workload remotely. The cost function may also consider the cost of sending or migrating the workload and state to another site for remote handling. The migration may be complementary to the initial decision on distribution to place the workloads. Thus, the orchestrator may consider a plurality of factors to determine an optimal and dynamic distribution of workloads between the levels of hierarchy based on one or more constraints. Other workload distribution schemes such as load balancing do not consider the specific capabilities of a computing resource. Furthermore, other workload distribution schemes may not preserve the state of a workload in the distribution decision. The constraints for the cost function may include policies, service level agreements, customer inputs, and the like. The cost function may implement techniques such as a 0-1 loss function or a quadratic loss function.

In an embodiment, the inputs to the workload optimization may include the following inputs:

Pipeline of modules for an edge application/service

CPU, GPU (and other types of accelerators for machine learning operations such as FPGAs, VPUs, etc.), memory and network requirements of each module in the pipeline (multi-dimensional resource vector)

Size of the accumulated state for each module

Resource capacities of each edge in the hierarchy (a multi-dimensional resource vector)

In an embodiment, the decisions may include:

Assign each module to an edge location by matching the demands to capacities

Adapt to changing resource demands by migrating modules along with their state

Objective function: Combination of,
a. Maximize Application defined utility function (e.g., accuracy of output)
b. Minimize Resource usage at the edges Additional parameters for determining workload distribution can include network statistics including round trip time (RTT), bandwidth, loss rates, jitter, etc.

In an embodiment, the orchestrator can determine state transfer requirements pertaining to a workload, runtime duration of the workload, and number of CPU cycles required to execute the workload. This data can be utilized by the orchestrator to determine an estimated cost for the workload with respect to executing the workload on the edge versus executing the workload on the cloud. In an example, the orchestrator may transmit a data packet containing an instruction to the local edge manager that indicates which workloads are to be offloaded to the cloud for execution thereon. In some embodiments, the local edge manager can be configured to compute the cost function for the workload.

The local edge manager can be configured to determine which state information pertaining to the workload should be sent to the cloud to allow the cloud to execute the workload. Appropriate state information can be transmitted to the orchestrator. The orchestrator can receive this state information and can execute the workload using the state information provided by the local edge manager. The local edge manager may continue to determine local capacity information and may send updates to the orchestrator. This data may be used to update cost function estimates for executing workloads. If the orchestrator updates the cost estimates, updated instructions can be transmitted from the orchestrator to the local edge manager. For example, degradation of connectively between the edge and the cloud can cause changes to the workload distribution.

In an embodiment, in order to determine a cost for a given workload, a model of the execution behavior of the workload in the form of an annotated graph may be used. A linear program solver may be used to locate a substantially optimal partitioning strategy that optimizes cost based on one or more constraints.

Referring to the appended drawings, in which like numerals represent like elements throughout the several FIGURES, aspects of various technologies for remote management of computing resources will be described. In the following detailed description, references are made to the accompanying drawings that form a part hereof, and which are shown by way of illustration specific configurations or examples.

The present disclosure may be implemented in a mobile edge computing (MEC) environment implemented in conjunction with a 4G, 5G, or other cellular network. MEC is a type of edge computing that uses cellular networks and 5G and enables a data center to extend cloud services to local deployments using a distributed architecture that provide federated options for local and remote data and control management. MEC architectures may be implemented at cellular base stations or other edge nodes and enable operators to host content closer to the edge of the network, delivering high-bandwidth, low-latency applications to end users. For example, the cloud provider's footprint may be co-located at a carrier site (e.g., carrier data center), allowing for the edge infrastructure and applications to run closer to the end user via the 5G network.

FIG. 1 illustrates one example where users of a data center in accordance with some embodiments. FIG. 1 illustrates data center 100 and 110 that are configured to provide computing resources to users 140 via user computers 130. The computing resources provided by data centers 100 and 110 may be cached or replicated at edge nodes 120. The computing resources provided by the data centers 100 and 110 and edge nodes 120 may include various types of resources, such as computing resources, data storage resources, data communication resources, and the like. Each type of computing resource may be general-purpose or may be available in a number of specific configurations. For example, computing resources may be available as virtual machines. The virtual machines may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances, such as virtual machine instances or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

It should be appreciated that although the embodiments disclosed above are discussed in the context of virtual machines, other types of implementations can be utilized with the concepts and technologies disclosed herein. It should be also appreciated that the network topology illustrated in FIG. 1 has been greatly simplified and that many more networks and networking devices may be utilized to interconnect the various computing systems disclosed herein. These network topologies and devices should be apparent to those skilled in the art.

Figure 2A:
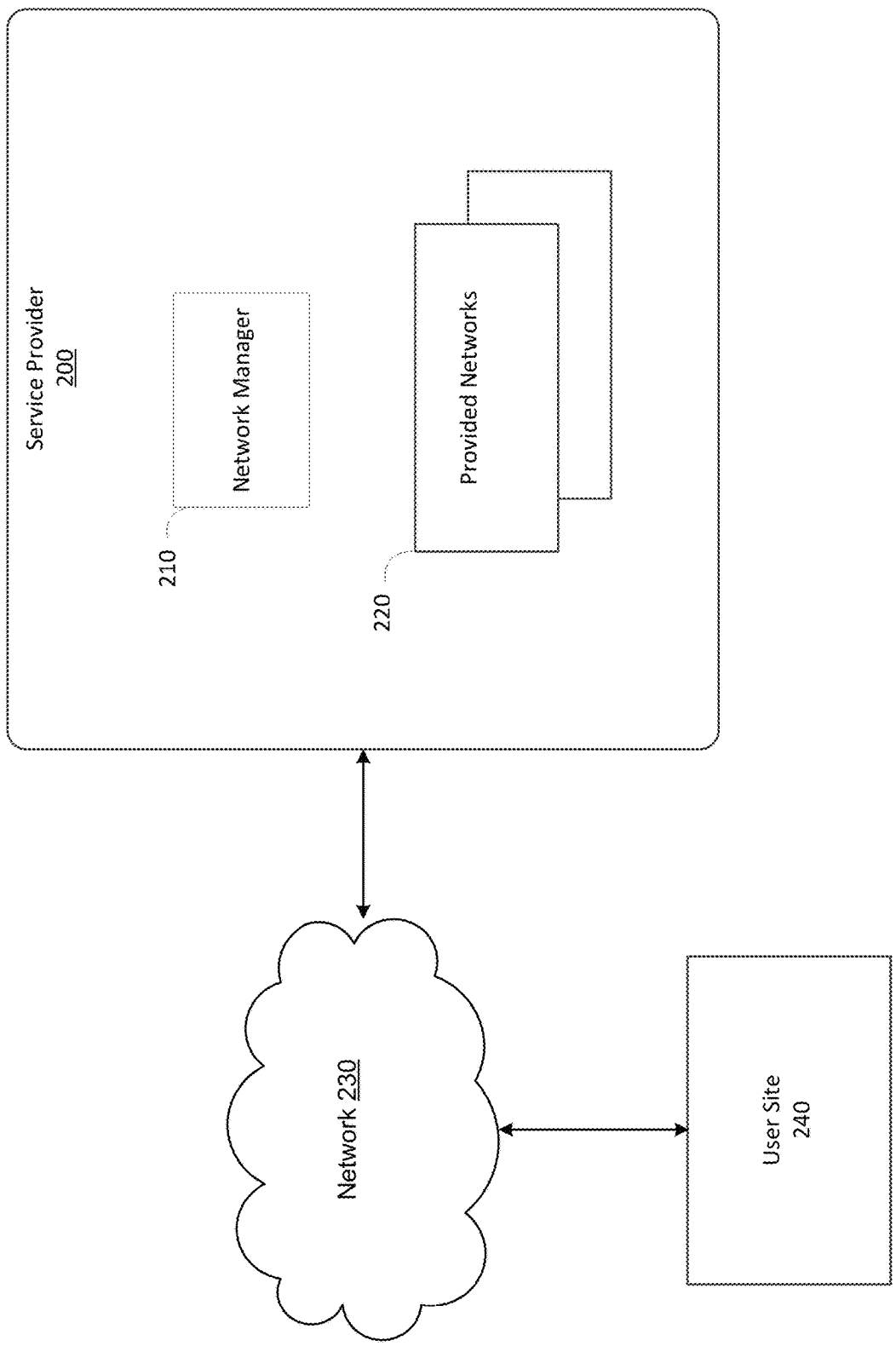
FIG. 2A is a diagram illustrating an example architecture in accordance with the present disclosure.

FIG. 2A illustrates an example computing environment in which the embodiments described herein may be implemented. FIG. 2A illustrates a service provider 200 that is configured to provide computing resources to users at user site 240. The user site 240 may have user computers that may access services provided by service provider 200 via a network 230. The computing resources provided by the service provider 200 may include various types of resources, such as computing resources, data storage resources, data communication resources, and the like. For example, computing resources may be available as virtual machines. The virtual machines may be configured to execute applications, including Web servers, application servers, media servers, database servers, and the like. Data storage resources may include file storage devices, block storage devices, and the like. Networking resources may include virtual networking, software load balancer, and the like.

Service provider 200 may have various computing resources including servers, routers, and other devices that may provide remotely accessible computing and network resources using, for example, virtual machines. Other resources that may be provided include data storage resources. Service provider 200 may also execute functions that manage and control allocation of network resources, such as a network manager 220.

Network 230 may, for example, be a publicly accessible network of linked networks and may be operated by various entities, such as the Internet. In other embodiments, network 230 may be a private network, such as a dedicated network that is wholly or partially inaccessible to the public. Network 230 may provide access to computers and other devices at the user site 240.

Figure 2B:
FIG. 2B is a diagram illustrating an example architecture in accordance with the present disclosure.

FIG. 2B illustrates an example computing environment in which the embodiments described herein may be implemented. FIG. 2B illustrates that an edge site 250 may be implemented to extend the physical reach of service provider 200 to provide localized computing resources to users at user site 240 using provided networks 260. The computing resources provided by the edge site 250 may include some or all of the various types of resources provided by service provider 200. The resources at edge site 250 may be under the control of service provider 200.

Figure 3:
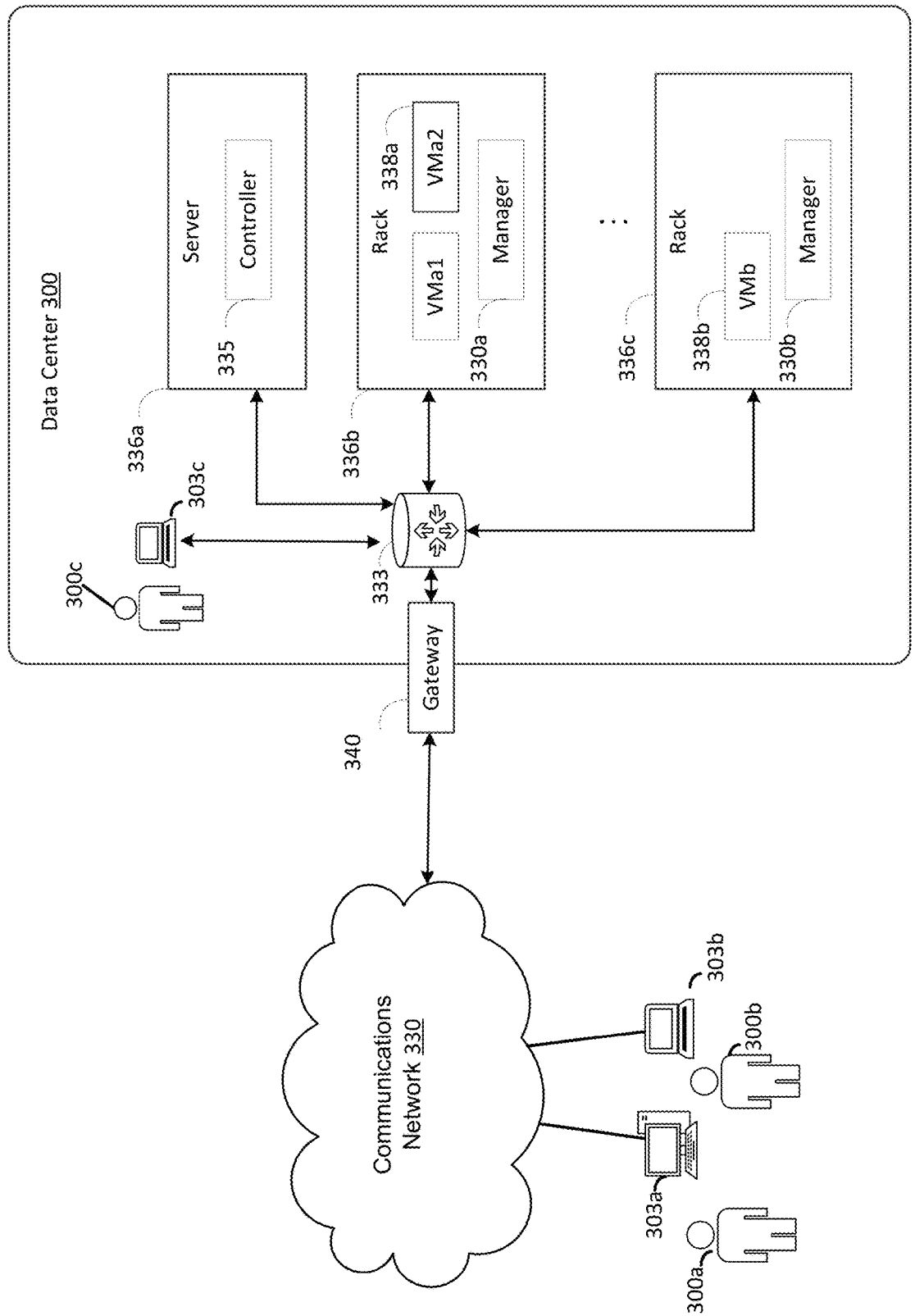
FIG. 3 is a diagram illustrating a data center in accordance with the present disclosure.

FIG. 3 illustrates an example computing environment in which the embodiments described herein may be implemented. FIG. 3 illustrates a data center 300 that is configured to provide computing resources to users 300a, 300b, or 300c (which may be referred herein singularly as "a user 300" or in the plural as "the users 300") via user computers 303a, 303b, and 303c (which may be referred herein singularly as "a computer 303" or in the plural as "the computers 303") via a communications network 330. The computing resources provided by the data center 300 may include various types of resources, such as computing resources, data storage resources, data communication resources, and the like. Each type of computing resource may be general-purpose or may be available in a number of specific configurations. For example, computing resources may be available as virtual machines. The virtual machines may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances, such as virtual machine instances or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

Data center 300 may correspond to service provider 100 in FIGS. 1 and 2, or edge site 150 of FIG. 2. Data center 300 may include servers 336a, 336b, and 336c (which may be referred to herein singularly as "a server 336" or in the plural as "the servers 336") that may be standalone or installed in server racks, and provide computing resources available as virtual machines 338a and 338b (which may be referred to herein singularly as "a virtual machine 338" or in the plural as "the virtual machines 338"). The virtual machines 338 may be configured to execute applications such as Web servers, application servers, media servers, database servers, and the like. Other resources that may be provided include data storage resources (not shown on FIG. 3) and may include file storage devices, block storage devices, and the like. Servers 336 may also execute functions that manage and control allocation of resources in the data center, such as a controller 335. Controller 335 may be a fabric controller or another type of program configured to manage the allocation of virtual machines on servers 336.

Referring to FIG. 3, communications network 330 may, for example, be a publicly accessible network of linked networks and may be operated by various entities, such as the Internet. In other embodiments, communications network 330 may be a private network, such as a corporate network that is wholly or partially inaccessible to the public.

Communications network 330 may provide access to computers 303. Computers 303 may be computers utilized by users 300. Computer 303a, 303b or 303c may be a server, a desktop or laptop personal computer, a tablet computer, a smartphone, a set-top box, or any other computing device capable of accessing data center 300. User computer 303a or 303b may connect directly to the Internet (e.g., via a cable modem). User computer 303c may be internal to the data center 300 and may connect directly to the resources in the data center 300 via internal networks. Although only three user computers 303a, 303b, and 303c are depicted, it should be appreciated that there may be multiple user computers.

Computers 303 may also be utilized to configure aspects of the computing resources provided by data center 300. For example, data center 300 may provide a Web interface through which aspects of its operation may be configured through the use of a Web browser application program executing on user computer 303. Alternatively, a stand-alone application program executing on user computer 303 may be used to access an application programming interface (API) exposed by data center 300 for performing the configuration operations.

Servers 336 may be configured to provide the computing resources described above. One or more of the servers 336 may be configured to execute a manager 330a or 330b (which may be referred to herein singularly as "a manager 330" or in the plural as "the managers 330") configured to execute the virtual machines. The managers 330 may be a virtual machine monitor (VMM), fabric controller, or another type of program configured to enable the execution of virtual machines 338 on servers 336, for example.

It should be appreciated that although the embodiments disclosed above are discussed in the context of virtual machines, other types of implementations can be utilized with the concepts and technologies disclosed herein.

In the example data center 300 shown in FIG. 3, a network device 333 may be utilized to interconnect the servers 330a and 330b. Network device 333 may comprise one or more switches, routers, or other network devices. Network device 333 may also be connected to gateway 340, which is connected to communications network 330. Network device 333 may facilitate communications within networks in data center 300, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 3 has been greatly simplified and that many more networks and networking devices may be utilized to interconnect the various computing systems disclosed herein. These network topologies and devices should be apparent to those skilled in the art.

It should also be appreciated that data center 300 described in FIG. 3 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, smartphone, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 4:
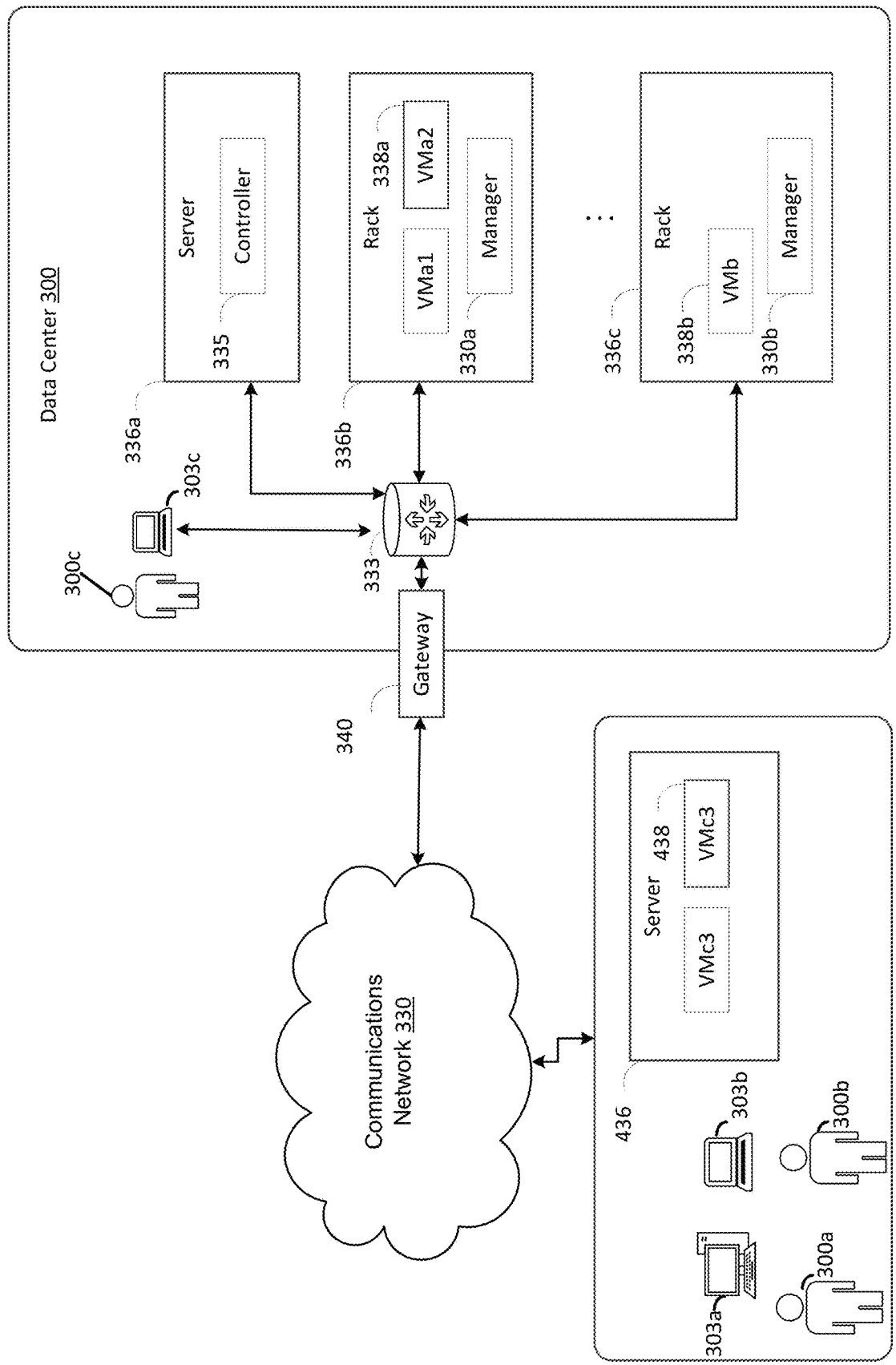
FIG. 4 is a diagram illustrating a data center and local resources in accordance with the present disclosure.

FIG. 4 illustrates an example computing environment illustrating integration of computing resources that include an edge site 420 that is geographically proximate to a facility local to users 300, in accordance with the present disclosure. In one embodiment, one or more servers 436 may be installed at the edge site 420. In an embodiment, servers 436 instantiate and run virtual machines 438.

In some embodiments, users 300 may specify configuration information for a virtual network to be provided for the user, with the configuration information optionally including a variety of types of information such as network addresses to be assigned to computing endpoints of the provided computer network, network topology information for the provided computer network, network access constraints for the provided computer network. The network addresses may include, for example, one or more ranges of network addresses, which may correspond to a subset of virtual or private network addresses used for the user's private computer network. The network topology information may indicate, for example, subsets of the computing endpoints to be grouped together, such as by specifying networking devices to be part of the provided computer network, or by otherwise indicating subnets of the provided computer network or other groupings of the provided computer network. The network access constraint information may indicate, for example, for each of the provided computer network's computing endpoints, which other computing endpoints may intercommunicate with the computing node endpoint, or the types of communications allowed to/from the computing endpoints.

Figure 5:
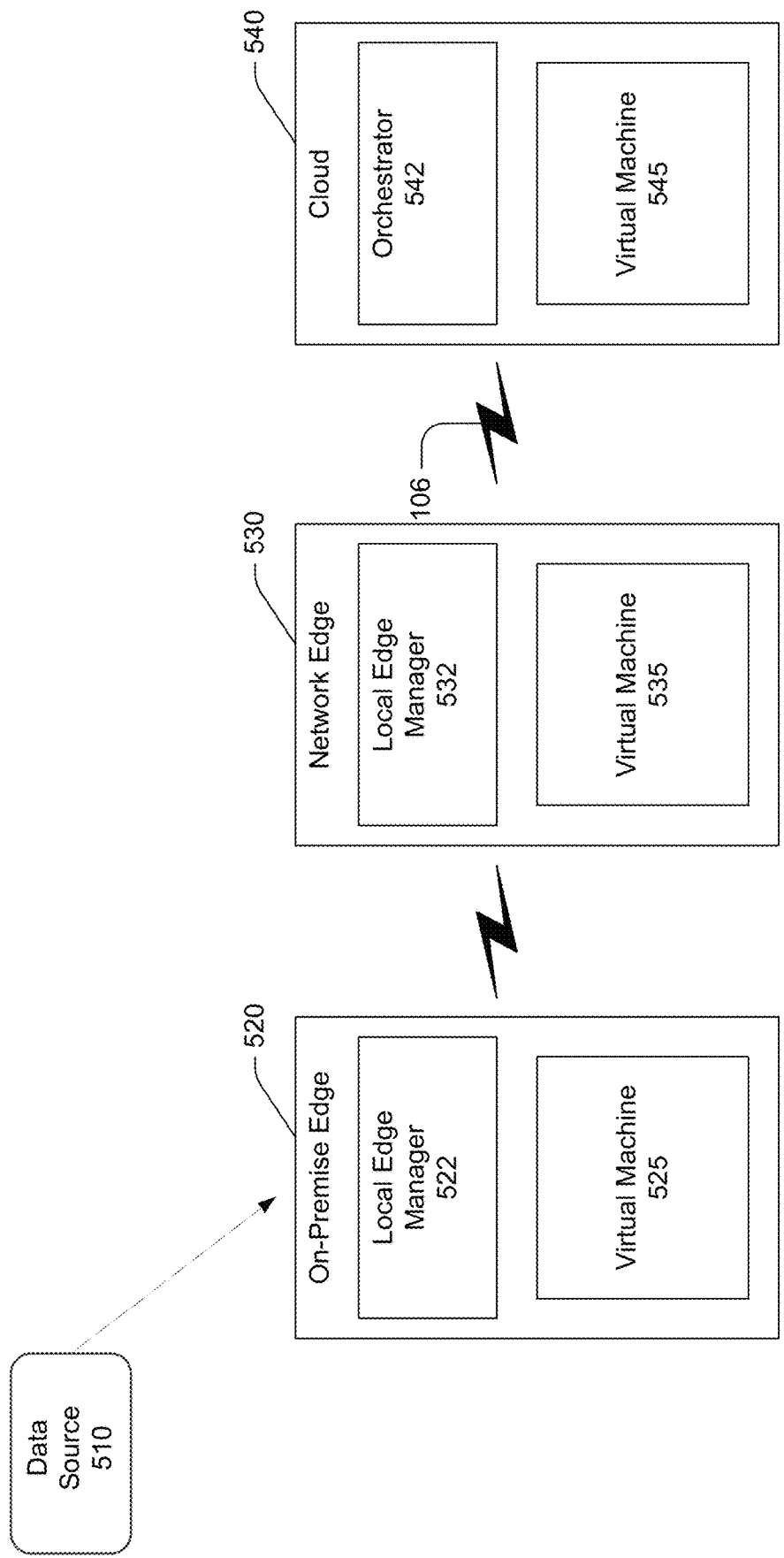
FIG. 5 is a diagram illustrating an architecture for managing resources in accordance with the present disclosure.

With reference to FIG. 5, illustrated is one example architecture for providing management of computing resources in accordance with the present disclosure. In an embodiment, the architecture may include an on-premise edge 520 that includes a local edge manager 522. The on-premise edge 520 may include resources such as virtual machine 525. In an embodiment, the architecture may include a network edge 530 that includes a local edge manager 532. The network edge 530 may include resources such as virtual machine 535. In an embodiment, the architecture may include a cloud node 540 that orchestrator 542. The cloud node 540 may include resources such as virtual machine 545. Data source 510 may provide data for initial processing by on-premise edge 520. Further tasks of a processing pipeline may be processed at network edge 530. Additional tasks of the processing pipeline may be processed at the cloud node 540. The orchestrator 542 may cooperate with local edge manager 532 and local edge manager 522 to distribute tasks of the processing pipeline.

In one example, a processing pipeline may be configured to provide a video processing pipeline. The video processing pipeline may include a background subtraction detector, line occupancy analyzer, light DNN detect, and heavy DNN detector. Additionally, media, IoT, and other services may be provided. The workloads for the video processing pipeline may be distributed at the on-premise edge 520, network edge 530, and cloud node 540.

Figure 6:
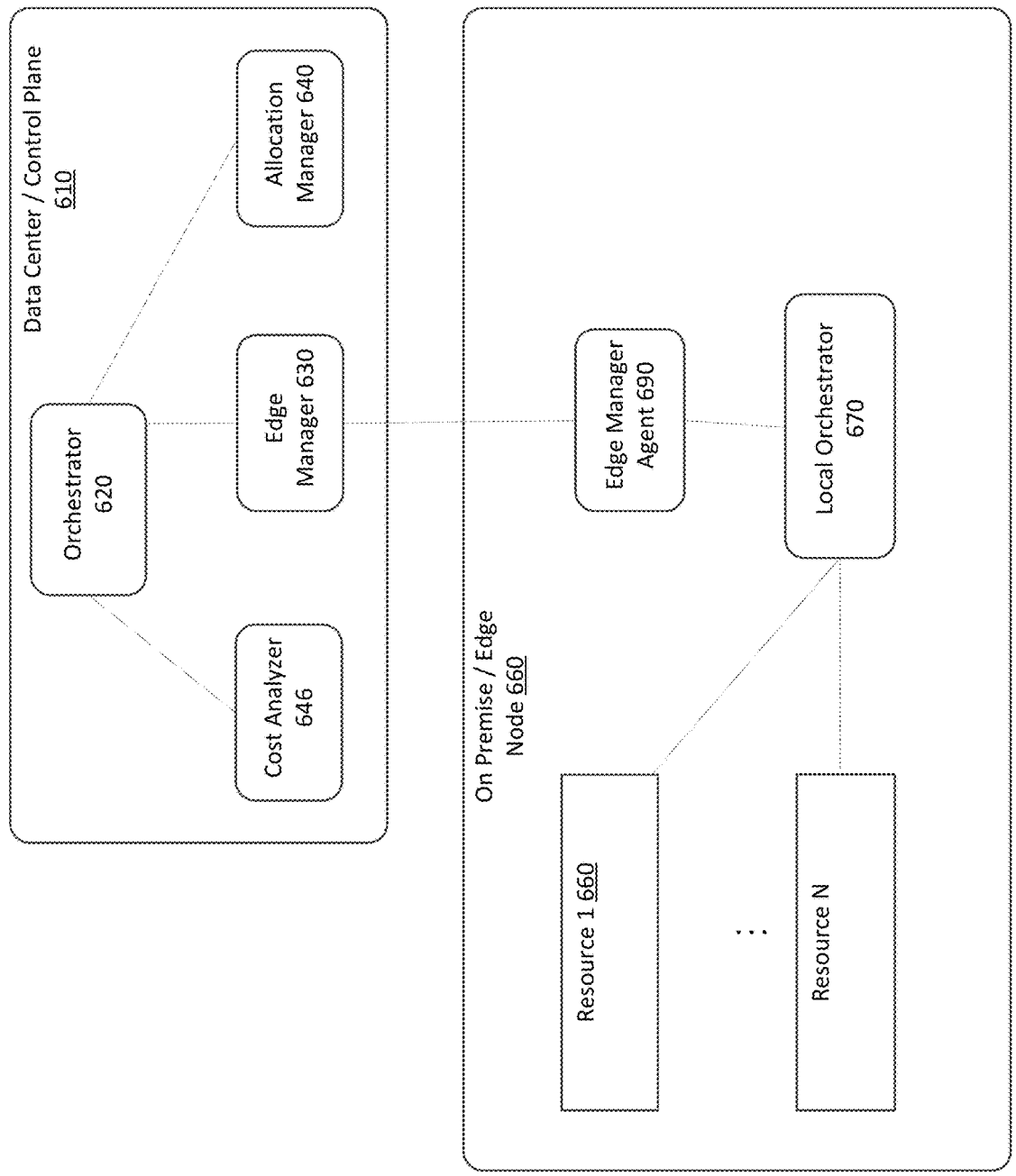
FIG. 6 is a diagram illustrating an architecture for managing resources in accordance with the present disclosure.

With reference to FIG. 6, illustrated is one example architecture for providing management of computing resources in accordance with the present disclosure. FIG. 6 adds further detail to the example architecture shown in FIG. 5. In an embodiment, the architecture may include an edge node 660 that may include one or more resources 660. The edge node 660 may include local edge manager agent 690, which may be a service running on the edge node 660 and configured to monitor local resources and capacities. The edge manager agent 690 may be configured to track workloads that are being processed at the edge node 660 and may monitor various metrics including availability, read and write latency, etc. The current status of all resources may be sent to orchestrator 620 for performing actions as needed.

Edge manager agent 690 may be executed as a service running on the edge node 660. Edge manager agent 690 may be configured to receive requests for operations from edge manager 630 at the data center 610. The edge manager agent 690 may perform the requested operations at the edge node 660. A local orchestrator 670 may distribute tasks among resources at the edge node 660.

The orchestrator 620 may be located in the data center/control plane 610. The orchestrator 620 may be configured to receive information pertaining to resources in an edge site. The information may be used to determine whether a workload should be handled by the edge node 660. The information may be used to determine whether a workload should be migrated to the edge node 660. The migration may be complementary to the initial decision on distribution to place the workloads.

Allocation manager 640 may be configured to determine a suitable edge site for executing a given workload (e.g., virtual machines, containers, etc.). The allocation manager 640 may further be configured to maintain a list of all nodes at an edge site, their capabilities, and what workloads are currently running on each server node. The capability list may be modified when a new information is received from edge manager agent 660.

Figure 7:
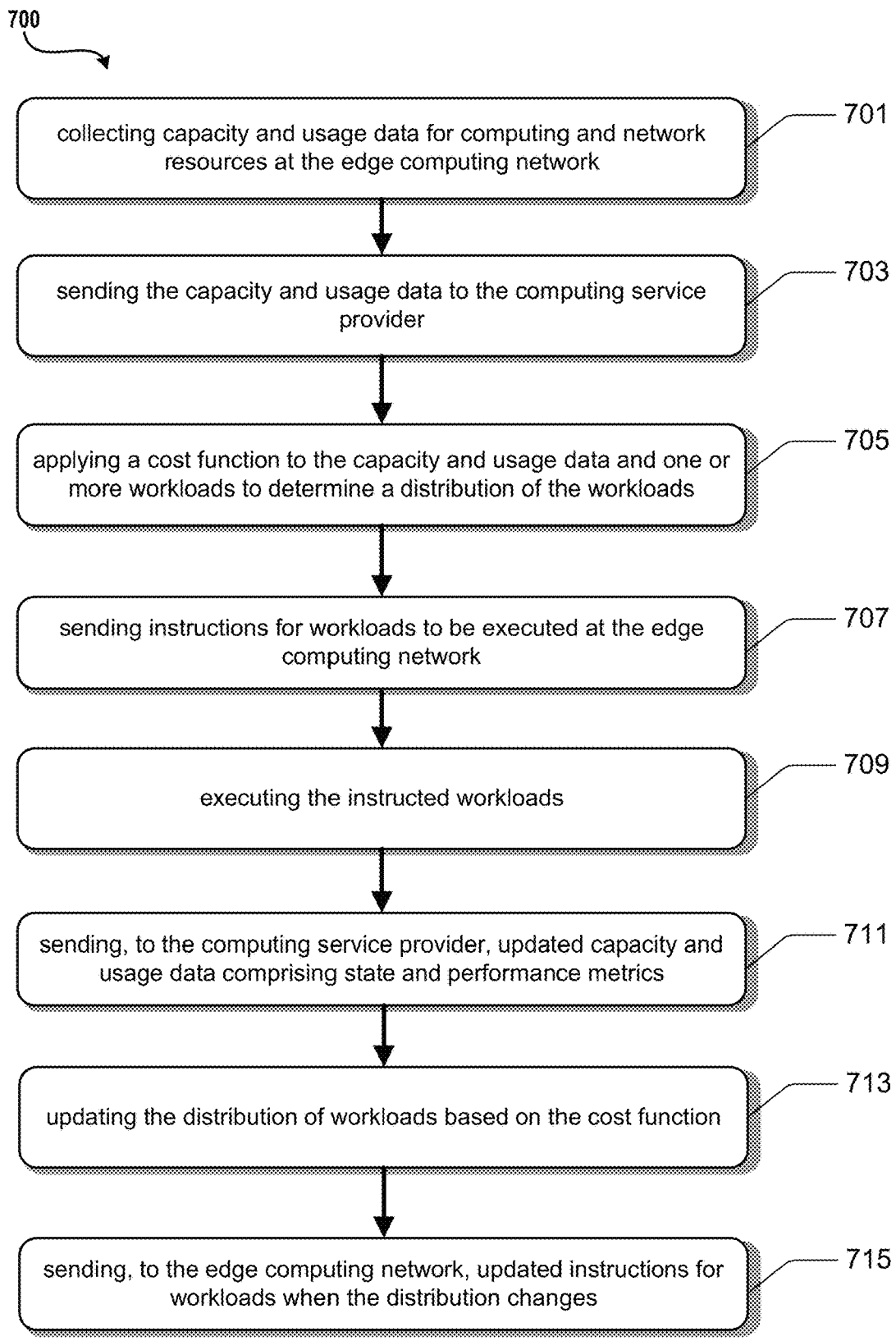
FIG. 7 is a flowchart depicting an example procedure for managing resources in accordance with the present disclosure.

Turning now to FIG. 7, illustrated is an example operational procedure for managing computing resources in accordance with the present disclosure. Such an operational procedure can be provided by one or more components illustrated in FIGS. 1 through 6. The operational procedure may be implemented in a computing environment comprising a computing service provider and an edge computing network. The edge computing network may comprise computing and storage devices configured to extend computing resources of the computing service provider to remote users of the computing service provider.

It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

It should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof. Thus, although the routine 300 is described as running on a system, it can be appreciated that the routine 300 and other operations described herein can be executed on an individual computing device or several devices.

Referring to FIG. 7, operation 701 collecting, by the edge computing network, capacity and usage data for computing and network resources at the edge computing network.

Operation 701 may be followed by operation 703. Operation 703 illustrates sending the capacity and usage data to the computing service provider.

Operation 703 may be followed by operation 705. Operation 705 illustrates applying a cost function to the capacity and usage data and one or more workloads to determine, by the computing service provider, a distribution of the workloads. In an embodiment, the workloads pertain to a processing pipeline that has been partitioned into the workloads. In an embodiment, the workloads can be executed at the computing service provider or the edge computing network. In an embodiment, the cost function is usable to optimize the distribution of the workloads with respect to one or more criteria Operation 705 may be followed by operation 707. Operation 707 illustrates sending, by the computing service provider to the edge computing network, instructions for which of workloads are to be executed at the edge computing network.

Operation 707 may be followed by operation 709. Operation 709 illustrates executing, by the edge computing network, the instructed workloads.

Operation 709 may be followed by operation 711. Operation 711 illustrates sending, by the edge computing network to the computing service provider, updated capacity and usage data comprising state and performance metrics while executing the instructed workloads at the edge computing network.

Operation 711 may be followed by operation 713. Operation 713 illustrates based on the updated capacity and usage data, updating, by the computing service provider, the distribution of workloads based on the cost function.

Operation 713 may be followed by operation 715. Operation 715 illustrates sending, by the computing service provider to the edge computing network, updated instructions for workloads when the distribution changes.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, a computing system, an article of manufacture, such as a computer-readable storage medium, or a component including hardware logic for implementing functions, such as a field-programmable gate array (FPGA) device, a massively parallel processor array (MPPA) device, a graphics processing unit (GPU), an application-specific integrated circuit (ASIC), a multiprocessor System-on-Chip (MPSoC), etc.

A component may also encompass other ways of leveraging a device to perform a function, such as, for example, a) a case in which at least some tasks are implemented in hard ASIC logic or the like; b) a case in which at least some tasks are implemented in soft (configurable) FPGA logic or the like; c) a case in which at least some tasks run as software on FPGA software processor overlays or the like; d) a case in which at least some tasks run as software on hard ASIC processors or the like, etc., or any combination thereof. A component may represent a homogeneous collection of hardware acceleration devices, such as, for example, FPGA devices. On the other hand, a component may represent a heterogeneous collection of different types of hardware acceleration devices including different types of FPGA devices having different respective processing capabilities and architectures, a mixture of FPGA devices and other types hardware acceleration devices, etc.

Figure 8:
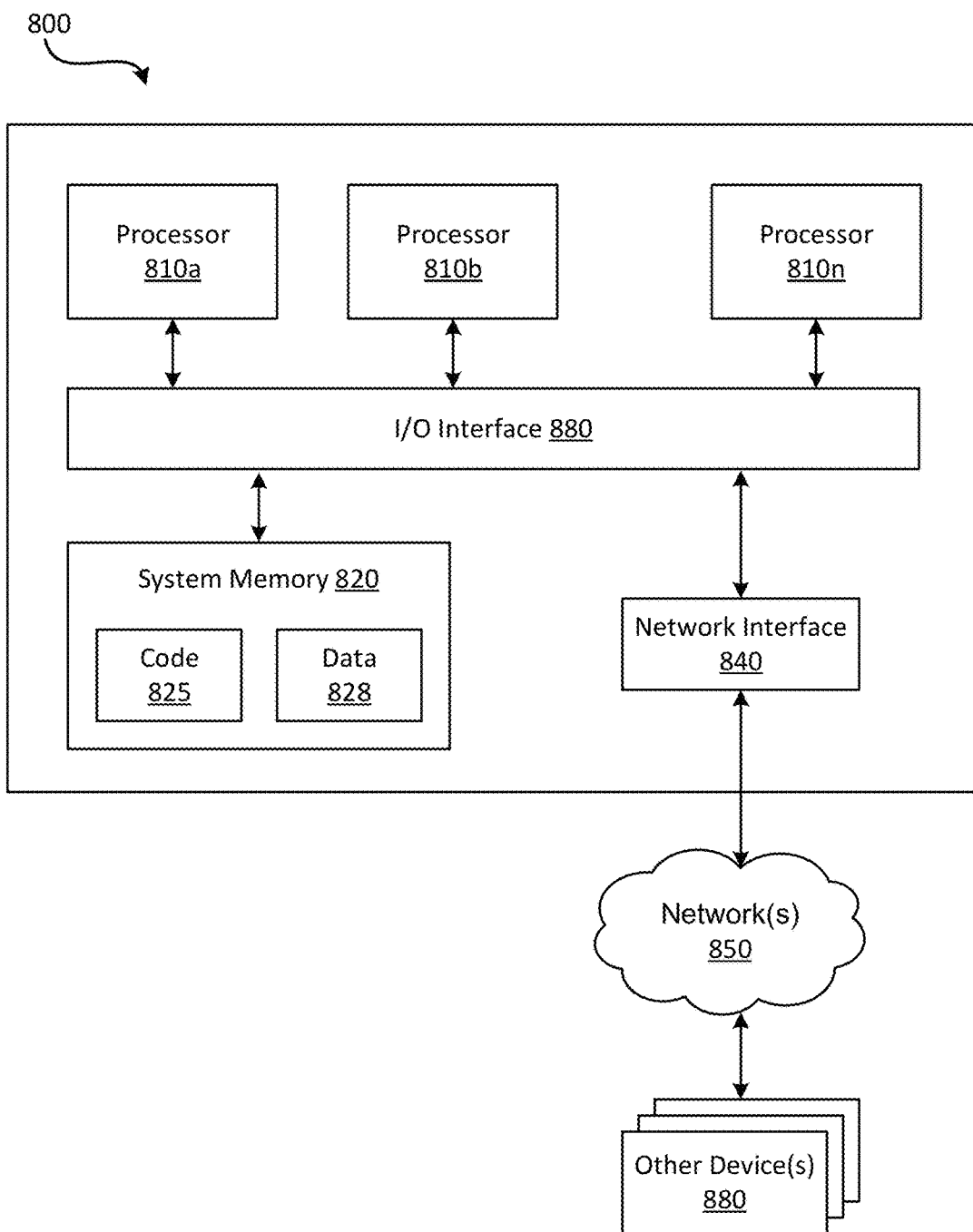
FIG. 8 is an example computing system in accordance with the present disclosure.

FIG. 8 illustrates a general-purpose computing device 800. In the illustrated embodiment, computing device 800 includes one or more processors 810*a*, 810*b*, and/or 810*n* (which may be referred herein singularly as "a processor 810" or in the plural as "the processors 810") coupled to a system memory 88 via an input/output (I/O) interface 830. Computing device 800 further includes a network interface 840 coupled to I/O interface 830.

In various embodiments, computing device 800 may be a uniprocessor system including one processor 810 or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x88, PowerPC, SPARC, or MIPS ISAs, or any other suitable ISA. In multiprocessor systems, each of processors 810 may commonly, but not necessarily, implement the same ISA.

System memory 88 may be configured to store instructions and data accessible by processor(s) 810. In various embodiments, system memory 88 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 820 as code 825 and data 828.

In one embodiment, I/O interface 830 may be configured to coordinate I/O traffic between the processor 810, system memory 88, and any peripheral devices in the device, including network interface 840 or other peripheral interfaces. In some embodiments, I/O interface 830 may perform any necessary protocol, timing, or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components. Also, in some embodiments some or all of the functionality of I/O interface 830, such as an interface to system memory 820, may be incorporated directly into processor 810.

Network interface 840 may be configured to allow data to be exchanged between computing device 800 and other device or devices 880 attached to a network or network(s) 880, such as other computer systems or devices as illustrated in FIGS. 1 through 5, for example. In various embodiments, network interface 840 may support communication via any suitable wired or wireless general data networks, such as types of Ethernet networks, for example. Additionally, network interface 840 may support communication via telecommunications/telephony networks such as analog voice networks or digital fiber communications networks, via storage area networks such as Fibre Channel SANs or via any other suitable type of network and/or protocol.

In some embodiments, system memory 820 may be one embodiment of a computer-accessible medium configured to store program instructions and data as described above for FIGS. 1-7 for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 800 via I/O interface 830. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 800 as system memory 820 or another type of memory. Further, a computer-accessible medium may include transmission media or signals such as electrical, electromagnetic or digital signals, conveyed via a communication medium such as a network and/or a wireless link, such as may be implemented via network interface 840. Portions or all of multiple computing devices, such as those illustrated in FIG. 8, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 8, may include other components that are not explicitly shown in FIG. 8, or may utilize an architecture completely different than that shown in FIG. 8.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The disclosure presented herein also encompasses the subject matter set forth in the following clauses:

Clause 1: A method for managing computing resources in a computing environment comprising a computing service provider and an edge computing network, the edge computing network comprising computing and storage devices configured to extend computing resources of the computing service provider to remote users of the computing service provider, the method comprising:
  collecting, by the edge computing network, capacity and usage data for computing and network resources at the edge computing network;
  sending the capacity and usage data to the computing service provider;
  applying a cost function to the capacity and usage data and one or more workloads to determine, by the computing service provider, a distribution of the workloads, wherein:
  the workloads pertain to a processing pipeline that has been partitioned into the workloads;
  the workloads can be executed at the computing service provider or the edge computing network; and
  the cost function is usable to optimize the distribution of the workloads with respect to one or more criteria;
  sending, by the computing service provider to the edge computing network, instructions for which of workloads are to be executed at the edge computing network;
  executing, by the edge computing network, the instructed workloads;
  sending, by the edge computing network to the computing service provider, updated capacity and usage data comprising state and performance metrics while executing the instructed workloads at the edge computing network;
  based on the updated capacity and usage data, updating, by the computing service provider, the distribution of workloads based on the cost function; and
  sending, by the computing service provider to the edge computing network, updated instructions for workloads when the distribution changes.

Clause 2: The method of clause 1, further comprising executing a local edge manager at the edge computing network, the local edge manager configured to monitor the capacity and usage data for computing and network resources at the edge computing network and send the capacity and usage data to the computing service provider.

Clause 3: The method of any of clauses 1-2, wherein the local edge manager is configured to monitor the capacity and usage data during execution of the workloads.

Clause 4: The method of any of clauses 1-3, further comprising executing an orchestrator at the computing service provider that is configured to determine the workload distributions based on the cost function.

Clause 5: The method of any of clauses 1-4, wherein the cost function is operable to determine an optimization of cost based on one or more constraints.

Clause 6: The method of any of clauses 1-5, wherein the constraints include a policy associated with a customer of the processing pipeline.

Clause 7: The method of clauses 1-6, wherein the local edge manager is configured to distribute the instructed workloads within the computing resources at the edge computing network.

Clause 8: The method of any of clauses 1-7, wherein the cost function is a 0-1 loss function.

Clause 9: A system comprising:
  one or more processors; and
  a memory in communication with the one or more processors, the memory having computer-readable instructions stored thereupon that, when executed by the one or more processors, cause the system to perform operations comprising:
  receiving, from an edge computing network comprising computing and storage devices configured to extend computing resources of a computing service provider to remote users of the computing service provider, capacity and usage data for computing and network resources at the edge computing network;
  applying a cost function to the capacity and usage data and one or more workloads to determine, by the computing service provider, a distribution of the workloads, wherein:
  the workloads pertain to a processing pipeline that has been partitioned into the workloads;
  the workloads can be executed at the computing service provider or the edge computing network; and
  the cost function is usable to optimize the distribution of the workloads with respect to one or more criteria;
  sending, to the edge computing network, instructions for workloads to be executed at the edge computing network;
  receiving, from the edge computing network, updated capacity and usage data comprising state and performance metrics while executing the instructed workloads at the edge computing network;
  based on the updated capacity and usage data, updating the distribution of workloads based on the cost function; and sending, to the edge computing network, updated instructions for workloads when the distribution changes.

Clause 10: The system of clause 9, further comprising computer-readable instructions stored thereupon that, when executed by the one or more processors, cause the system to perform operations comprising:

executing orchestrator configured to determine the workload distributions based on the cost function.

Clause 11: The system of any of clauses 9 and 10, wherein the cost function is operable to determine an optimization of cost based on one or more constraints.

Clause 12: The system of any clauses 9-11, wherein the constraints include a policy associated with a customer of the processing pipeline.

Clause 13: The system of any clauses 9-12, wherein the cost function is a 0-1 loss function.

Clause 14: A computer-readable storage medium having computer-executable instructions stored thereupon which, when executed by one or more processors of a computing device, cause the computing device to:

collecting capacity and usage data for computing and network resources at an edge computing network, the edge computing network comprising computing and storage devices configured to extend computing resources of a computing service provider to remote users of the computing service provider;

sending the capacity and usage data to the computing service provider;

receiving, from the computing service provider, instructions for workloads to be executed at the edge computing network, wherein a distribution of the workloads is determined based on the capacity and usage data using a cost function, the workloads pertaining to a processing pipeline that has been partitioned into the workloads, wherein:

the workloads pertain to a processing pipeline that has been partitioned into the workloads;

the workloads can be executed at the computing service provider or the edge computing network; and the cost function is usable to optimize the distribution of the workloads with respect to one or more criteria;

causing execution of the instructed workloads at the edge computing network;

sending, to the computing service provider, updated capacity and usage data comprising state and performance metrics while executing the instructed workloads at the edge computing network;

receiving, from the computing service provider, updated instructions for workloads when the distribution changes based on the updated capacity and usage data; and causing execution of the updated instructions at the edge computing network.

Clause 15: The computer-readable storage medium of clause 14, further comprising computer-executable instructions stored which, when executed by one or more processors of a computing device, cause the computing device to execute a local edge manager at the edge computing network, the local edge manager configured to monitor the capacity and usage data for computing and network resources at the edge computing network and send the capacity and usage data to the computing service provider.

Clause 16: The computer-readable storage medium of any of clauses 14 and 15, wherein the local edge manager is configured to monitor the capacity and usage data during execution of the workloads.

Clause 17: The computer-readable storage medium of any of the clauses 14-16, wherein the local edge manager is configured to distribute the instructed workloads within the computing resources at the edge computing network.

Clause 18: The computer-readable storage medium of any of the clauses 14-17, wherein the cost function is operable to determine an optimization of cost based on one or more constraints.

Clause 19: The computer-readable storage medium of any of the clauses 14-18, wherein the constraints include a policy associated with a customer of the processing pipeline.

Clause 20: The computer-readable storage medium of any of the clauses 14-19, wherein the cost function is a 0-1 loss function.

The invention claimed is:

1. A method for managing computing resources in a computing environment comprising a computing service provider and an edge computing network, the edge computing network comprising computing and storage devices configured to extend computing resources of the computing service provider to remote users of the computing service provider, the method comprising:

collecting, by the edge computing network, capacity and usage data for computing and network resources at the edge computing network;

sending the capacity and usage data to the computing service provider;

applying a cost function to the capacity and usage data, one or more workloads, a resource vector for the workloads, the resource vector including processing, memory, and network requirements, and an accumulated state size for the workloads;

based on applying the cost function, determining, by the computing service provider, a distribution of the workloads, wherein:

the workloads pertain to a processing pipeline that has been partitioned into the workloads;

the workloads can be executed at the computing service provider or the edge computing network; and the cost function is usable to optimize the distribution of the workloads with respect to one or more criteria;

sending, by the computing service provider to the edge computing network, instructions for which of workloads are to be executed at the edge computing network;

executing, by the edge computing network, the instructed workloads;

sending, by the edge computing network to the computing service provider, updated capacity and usage data comprising state and performance metrics while executing the instructed workloads at the edge computing network;

based on the updated capacity and usage data, updating, by the computing service provider, the distribution of the workloads based on the cost function; and sending, by the computing service provider to the edge computing network, updated instructions for workloads when the distribution changes.

2. The method of claim 1, further comprising executing a local edge manager at the edge computing network, the local edge manager configured to monitor the capacity and usage data for computing and network resources at the edge computing network and send the capacity and usage data to the computing service provider.

3. The method of claim 2, wherein the local edge manager is configured to monitor the capacity and usage data during execution of the workloads.

4. The method of claim 2, wherein the local edge manager is configured to distribute the instructed workloads within the computing resources at the edge computing network.

5. The method of claim 1, further comprising executing an orchestrator at the computing service provider that is configured to determine the workload distributions based on the cost function.

6. The method of claim 1, wherein the cost function is operable to determine an optimization of cost based on one or more constraints.

7. The method of claim 6, wherein the constraints include a policy associated with a customer of the processing pipeline.

8. The method of claim 1, wherein the cost function is a 0-1 loss function.

9. A system comprising:
one or more processors; and
a memory in communication with the one or more processors, the memory having computer-readable instructions stored thereupon that, when executed by the one or more processors, cause the system to perform operations comprising:
receiving, from an edge computing network comprising computing and storage devices configured to extend computing resources of a computing service provider to remote users of the computing service provider, capacity and usage data for computing and network resources at the edge computing network;
applying a cost function to the capacity and usage data, one or more workloads, a resource vector for the workloads, the resource vector including processing, memory, and network requirements, and an accumulated state size for the workloads;
based on applying the cost function, determining, a distribution of the workloads, wherein:
the workloads pertain to a processing pipeline that has been partitioned into the workloads;
the workloads can be executed at the computing service provider or the edge computing network; and
the cost function is usable to optimize the distribution of the workloads with respect to one or more criteria;
sending, to the edge computing network, instructions for workloads to be executed at the edge computing network;
receiving, from the edge computing network, updated capacity and usage data comprising state and performance metrics while executing the instructed workloads at the edge computing network;
based on the updated capacity and usage data, updating the distribution of the workloads based on the cost function; and
sending, to the edge computing network, updated instructions for workloads when the distribution changes.

10. The system of claim 9, further comprising computer-readable instructions stored thereupon that, when executed by the one or more processors, cause the system to perform operations comprising:
executing orchestrator configured to determine the workload distributions based on the cost function.

11. The system of claim 10, wherein the cost function is operable to determine an optimization of cost based on one or more constraints.

12. The system of claim 11, wherein the constraints include a policy associated with a customer of the processing pipeline.

13. The system of claim 9, wherein the cost function is a 0-1 loss function.

14. A computer-readable storage medium having computer-executable instructions stored thereupon which, when executed by one or more processors of a computing device, cause the computing device to:
collecting capacity and usage data for computing and network resources at an edge computing network, the edge computing network comprising computing and storage devices configured to extend computing resources of a computing service provider to remote users of the computing service provider;
sending the capacity and usage data to the computing service provider;
receiving, from the computing service provider, instructions for workloads to be executed at the edge computing network, wherein a distribution of the workloads is determined based on the capacity and usage data using a cost function applied to the capacity and usage data, the workloads, a resource vector for the workloads, the resource vector including processing, memory, and network requirements, and an accumulated state size for the workloads, the workloads pertaining to a processing pipeline that has been partitioned into the workloads, wherein:
the workloads pertain to a processing pipeline that has been partitioned into the workloads;
the workloads can be executed at the computing service provider or the edge computing network; and
the cost function is usable to optimize the distribution of the workloads with respect to one or more criteria;
causing execution of the instructed workloads at the edge computing network;
sending, to the computing service provider, updated capacity and usage data comprising state and performance metrics while executing the instructed workloads at the edge computing network;
receiving, from the computing service provider, updated instructions for workloads when the distribution changes based on the updated capacity and usage data; and
causing execution of the updated instructions at the edge computing network.

15. The computer-readable storage medium of claim 14, further comprising computer-executable instructions stored which, when executed by one or more processors of a computing device, cause the computing device to execute a local edge manager at the edge computing network, the local edge manager configured to monitor the capacity and usage data for computing and network resources at the edge computing network and send the capacity and usage data to the computing service provider.

16. The computer-readable storage medium of claim 15, wherein the local edge manager is configured to monitor the capacity and usage data during execution of the workloads.

17. The computer-readable storage medium of claim 15, wherein the local edge manager is configured to distribute the instructed workloads within the computing resources at the edge computing network.

18. The computer-readable storage medium of claim 14, wherein the cost function is operable to determine an optimization of cost based on one or more constraints.

19. The computer-readable storage medium of claim 18, wherein the constraints include a policy associated with a customer of the processing pipeline.

20. The computer-readable storage medium of claim 14, wherein the cost function is a 0-1 loss function.

* * * * *